United States Patent Office
2,992,029
Patented July 11, 1961

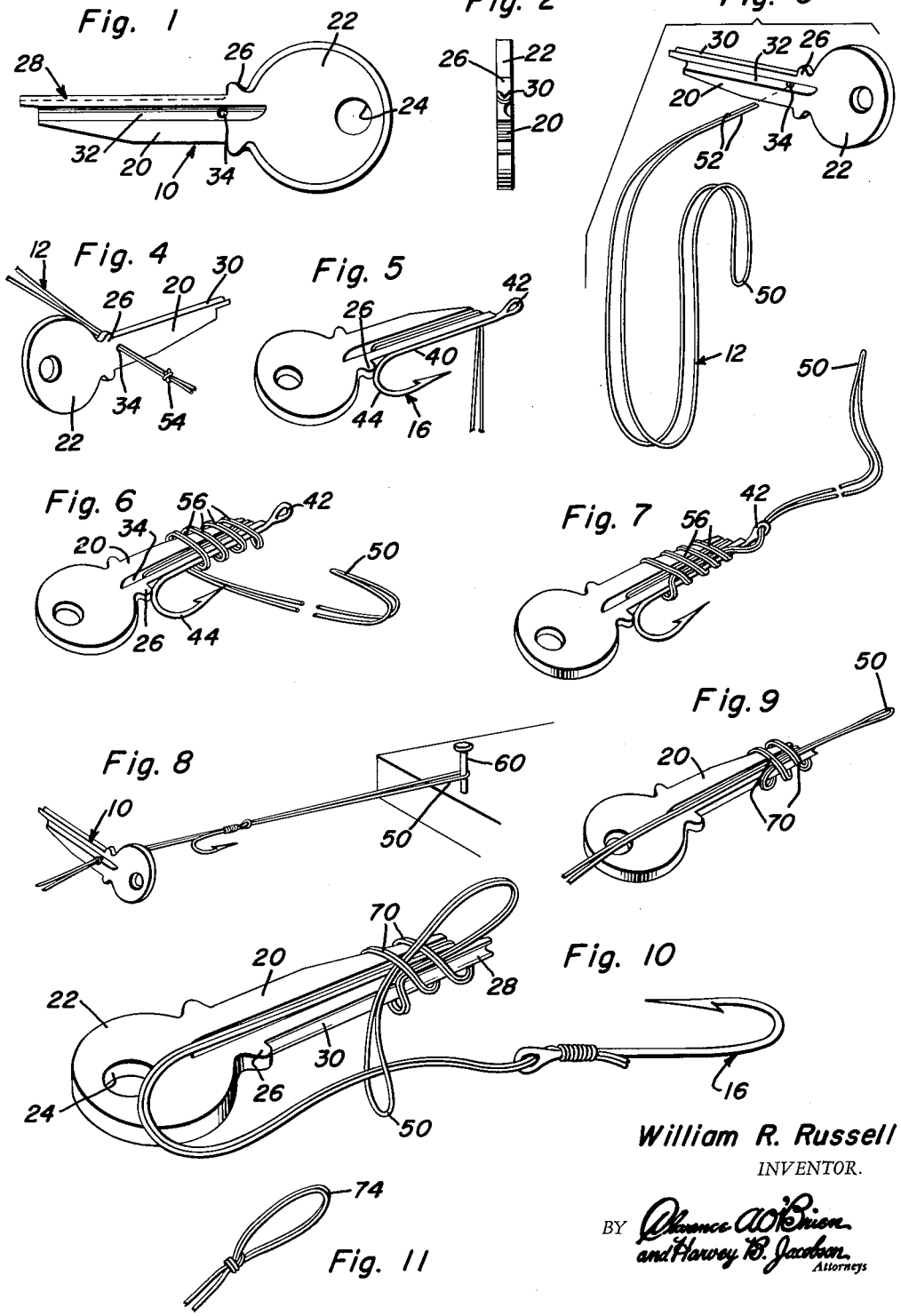

2,992,029
SNELLING TOOL FOR FISHHOOKS
William R. Russell, 122 S. Coolsprings St., Fayetteville, N.C., assignor of forty-five percent to Sam W. Greenway and five percent to Coy E. Brewer, both of Fayetteville, N.C.
Filed Nov. 25, 1958, Ser. No. 776,241
7 Claims. (Cl. 289—17)

This invention comprises a novel and useful snelling tool for fishhooks and more generally pertains to a tool to facilitate the operation of applying a monofilament or other leader to a fishhook and a process for snelling a fishhook in accordance therewith.

The primary object of this invention is to provide both a tool and a method whereby the snelling of fishhooks by the application of a monofilament or other leader thereto may be performed with greater certainty and celerity.

A further object of the invention is to provide a tool in accordance with the foregoing object which shall be of an extremely simple and lightweight construction, and yet shall be specifically adapted for the particular purpose of snelling a fishhook.

Another object of the invention is to provide a tool of a simple one-piece construction which may be readily fabricated as by stamping or the like from a blank which may comprise or closely resemble a conventional key for operating cylinder locks.

Another important object of the invention is to provide a tool of a simple one-piece construction having provision for supporting a fishhook to be snelled in a convenient and proper position thereon together with further means which will facilitate the passing of the leader beneath loops which are wound upon the shank of the fishhook, to more effectively and quickly form knots therein.

A further object of the invention is to provide a tool in accordance with the foregoing objects having provision for receiving and retaining the loose ends of a looped leader for a fishhook during the snelling operation to be performed upon the latter.

Still another object of the invention is to provide a method whereby a conventional monofilament or other type of looped leader may be applied with greater exactness, speed and efficiency to a fishhook and whereby the end of the leader may be provided with a double loop therein by which it may be attached to a fishing line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of a snelling tool in accordance with this invention;

FIGURE 2 is an end elevation view of the same taken from the left end of FIGURE 1;

FIGURE 3 is a perspective view indicating the manner in which the loose ends of a looped leader may be inserted through an aperture in the tool for retaining the leader secured thereto;

FIGURE 4 is a view illustrating the manner in which the loose ends of the leader after insertion through the aperture in the shank of the tool are knotted to prevent their unvoluntary withdrawal therefrom;

FIGURE 5 is a perspective view showing the next step in the operation of snelling in accordance with this invention and illustrating in particular the manner in which a fishhook is disposed in the grooves formed in the edge of the tool with its hook seated against a laterally projecting shoulder of the tool, and whereby the looped leader is then passed along a channel in the shank of a tool in readiness for looping the same about the fishhook stem;

FIGURE 6 is a view similar to FIGURE 5 but showing as the next step of the operation the winding of the leader about the stem of the fishhook to form the necessary turns for mounting the leader on the fishhook;

FIGURE 7 is a view similar to FIGURE 6 but showing the further step of then passing the looped end of the leader along the channel of the shank and beneath the turns wound upon the shank and stem, and then through the eye of the fishhook;

FIGURE 8 is a view showing the manner in which the looped end of the leader is attached to a stationary support and pulled from the end of the shank with the fishhook, thereby tightening the turns and knotting the same upon the shank of the fishhook;

FIGURE 9 is a view showing the manner of using the tool for next successive step and discloses the initial phases of forming a knotted double loop at the end of the leader;

FIGURE 10 is a perspective view showing a further stage in the forming of the knotted double loop at the end of the leader; and FIGURE 11 is a perspective view of the double knotted and double looped end of the leader formed by the steps of FIGURES 9 and 10.

There have been heretofore known various tools which will facilitate the tying of knots in strands or the like, and further tools specifically adapted to the knotting of strands upon a fishhook for the purpose of snelling the same. However, such devices usually embody a number of working parts, and are generally cumbersome in structure, expensive and complicated or difficult to operate. It is the purpose of the present invention to provide a very simple construction of tool which will be free of all the above mentioned objections.

In the drawings illustrating a preferred embodiment of tool for snelling fishhooks in accordance with the principles of this invention there is indicated generally by the numeral 10 a snelling tool while the numeral 12 designates generally a leader to be snelled upon a fishhook, which leader may be either of the monofilament or of a stranded type as desired, while the numeral 16 designates a conventional form of fishhook which is to be snelled in accordance with this invention.

The tool 10 is formed of a single blank of material in the shape of a conventional type of key for operating a cylinder lock, the tool includes an elongated shank portion 20 at one end of which there is provided a diametrically enlarged head or head portion 22, which for convenience may be provided with an aperture 24 for the usual purpose. At the junction of the shank with the head the tool is provided with a laterally projecting portion or shoulder 26 for a purpose to be subsequently set forth.

One side of the shank of the tool is provided with a straight edge 28 and a semi-cylindrical recess in the form of a groove 30 is provided in this edge extending from the shoulder 26 to the other end of the shank.

Preferably parallel to the straight edge 28 there is provided upon one face of the shank a longtiudinal extending recess or channel 32 having one end starting in the head portion 20 and having the other end open at the other end of the shank. As will be observed particularly from FIGURE 1, the edge portion of the shank which has the groove 30 therein is longer than and extends beyond the extremity of the rest of the shank and of the channel 32.

Disposed in the channel and preferably closely adjacent to the shoulder 26 and the head 22 is a bore or aperture 34.

As will now be readily apparent, the tool is of very simple one-piece construction, and may be readily formed from a suitable blank as by stamping or any other conventional manner, and may in some instances even be formed from a discarded key. A conventional form of fishhook 16 includes an elongated stem 40 having an eye 42 at one end thereof and the usual barbed hook 44 at its other extremity.

It should be understood that the shank is of sufficient thickness whereby the groove 30 in the edge 28 thereof is of greater width than the thickness of the stem 40 in order that the latter may be snugly received in this groove as will be apparent from FIGURES 5–7.

The leader 12 is folded upon itself to provide a looped end 50 and a pair of loose extremities 52.

The operation of the tool and the process of snelling a fishhook in accordance therewith will now be described. Referring first to FIGURES 3 and 4 it will be seen that the two loose ends 52 of the leader are placed together and are inserted through the aperture 34 and after passing therethrough are then knotted as at 54 to prevent their inadvertent or accidental return through the aperture. This serves to secure the leader to the tool during the subsequent steps of the process of snelling a hook thereby. Referring next to FIGURE 5 it will be seen that the leader is pulled taut so that its knot 54 engages the reverse side of the shank 20 and the leader is then extended along the channel 32 until it projects beyond the open end of the same. The fishhook 16 is then placed against the straight edge of the shank, with the stem 40 being received in the groove 30 and with the hook 44 being rested against the laterally projecting shoulder 26. This positions the hook secure in parallel relation to that portion of the leader which lies in the channel 32. It will be noted that the shank is of such a length that in this position of the fishhook in the groove, the eye 42 is projected beyond the end of the shank for a purpose to be subsequently apparent.

Next, as shown in FIGURE 6, the projecting looped end of the leader is wound several times about the shank and the fishhook placed against the edge thereof whereby there are provided a number of turns of leader as at 56, these turns embracing the shank, the stem of the fishhook and the portion of the leader lying in the channel 32.

After the step of FIGURE 6 is completed, the looped end 50 of the leader is then passed through the channel 34 beneath the turns or windings 56 and then is passed through the eye 42 as shown in FIGURE 7. The leader is now ready to be knotted upon the shank of the fishhook, and for this purpose the looped end 50 may be placed over a suitable stationary support such as that indicated at 60 and by gently pulling the tool away from the support 60 while disposed in endwise alignment therewith, the loops 56 will be gradually withdrawn from the shank, and upon further pulling movement as shown in FIGURE 8, they will be caused to tighten and be knotted upon the shank adjacent the eye. It will be noted that this last movement as shown in FIGURE 8 is facilitated by the knot 54 of the loose ends of the leader being engaged and pressed by the shank itself.

After the looped leader has been thus snelled or knotted upon the shank adjacent the eye thereof, it is next desired to provide a double loop at the looped end to render this portion of the leader stronger and provide a secure means whereby a fishing line may be secured to the leader. For this purpose, the knotted extremity of the leader is cut off closely adjacent to that portion of the leader which is snelled upon the fishhook and as shown in FIGURE 9 a mid-portion of the leader is again placed in the channel 34, with the looped end of the leader projecting beyond the other end of the shank from the headed portion. In this position, the looped end of the leader is then caused to make a number of turns as at 70 about the end of the shank and the mid-portion of the leader lying in the channel therein, after which as shown in FIGURE 10 the looped end 50 is passed under one of the loops 70 and over the other, after which the hook 16 is passed through the loop 50. Thereupon by pulling upon the hook, the turns 70 are gradually withdrawn from the end of the shank pulling the leader through the loop 50 and tightening the same. This operation results in the forming of a double loop as at 74 upon the looped end of the leader which is remote from the fishhook thus providing a secure fastener by which a fishing line may be attached thereto.

It will thus be apparent there is provided a tool which will greatly facilitate the snelling of fishhooks together with a novel process by which a monfilament or a braided leader may be snelled to a fishhook.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A snelling device for fishhooks comprising a flat plate-like key-shaped body having an elongated shank with a flat planar face and a straight edge along one side thereof and a laterally enlarged head at one end thereof, said edge having a groove extending from the other end of said shank for receiving the shank of a fishhook, said face having a channel opening from said shank other end and extending longitudinally thereof.

2. The combination of claim 1 wherein said shank has an aperture adjacent said head and opening into said channel.

3. The combination of claim 2 including a laterally projecting shoulder on said edge closing the adjacent end of said groove.

4. The combination of claim 1 including a laterally projecting shoulder on said edge closing the adjacent end of said groove.

5. The combination of claim 1 wherein said shank has its marginal edge portion containing said groove projecting longitudinally beyond its shank portion having said channel.

6. The combination of claim 1 wherein said channel extends into said head portion longitudinally beyond said groove.

7. The combination of claim 1 wherein the other edge of said body is inclined towards said straight edge adjacent said other end of said body.

References Cited in the file of this patent

UNITED STATES PATENTS

| | | |
|---|---|---|
| 2,697,624 | Thomas et al. | Dec. 21, 1954 |
| 2,714,304 | Dedda | Aug. 2, 1955 |
| 2,726,468 | Fahy | Dec. 13, 1955 |
| 2,934,369 | Kennedy | Apr. 26, 1960 |